United States Patent [19]

Kell et al.

[11] 4,276,173

[45] Jun. 30, 1981

[54] CELLULOSE ACETATE HOLLOW FIBER AND METHOD FOR MAKING SAME

[75] Inventors: Michael J. Kell, Concord; Robert D. Mahoney, Dublin, both of Calif.

[73] Assignee: Cordis Dow Corp., Miami, Fla.

[21] Appl. No.: 972,090

[22] Filed: Dec. 21, 1978

Related U.S. Application Data

[63] Continuation-in-part of Ser. No. 812,929, Jul. 5, 1977, abandoned.

[51] Int. Cl.³ .................. B01D 39/16; B01D 13/00
[52] U.S. Cl. ............................ 210/500.2; 210/646; 264/46.1; 264/200; 264/208
[58] Field of Search ............ 106/180, 189, 196; 210/23 H, 22, 23 F, 321 B, 500 M; 264/46.1, 45.9, 198, 200, 206, 208

[56] References Cited

U.S. PATENT DOCUMENTS

| | | | |
|---|---|---|---|
| 3,423,491 | 1/1969 | McLain et al. | 264/49 |
| 3,532,527 | 10/1970 | Skiens | 106/189 X |
| 3,546,209 | 12/1970 | Lipps, Jr. | 106/189 X |
| 3,592,672 | 7/1971 | Rowley et al. | 264/330 X |
| 3,745,202 | 7/1973 | Riggleman et al. | 264/41 |

*Primary Examiner*—Frank A. Spear, Jr.
*Attorney, Agent, or Firm*—Neal A. Waldrop

[57] ABSTRACT

An improved cellulose acetate semi-permeable hollow fiber suitable for use in artificial kidneys and a process for making same.

8 Claims, 2 Drawing Figures

CELLULOSE ACETATE HOLLOW FIBER AND METHOD FOR MAKING SAME

CROSS-REFERENCE TO RELATED APPLICATION

This application is a continuation-in-part application of co-pending application Ser. No. 812,929, filed July 5, 1977, entitled "Improved Cellulose Acetate Hollow Fibers and Method for Making Same," now abandoned.

BACKGROUND OF THE INVENTION

Cellulose esters, including cellulose acetate have been formed into semi-permeable hollow fibers and used as separatory membranes in a variety of processes including desalinization of sea water, ultrafiltration of aqueous and non-aqueous solutions, ion exchange processes, concentration of salts, purifying waste streams and the like. Permeable separatory membranes prepared from film-forming cellulose esters are disclosed in many U.S. Patents, the most pertinent of which that are known to applicants are Nos. 3,532,527 and 3,494,780. U.S. Pat. Nos. 3,532,527 and 3,494,780 describe a process of melt spinning cellulose esters, particularly cellulose triacetate and cellulose acetate, from a melt-spin composition consisting of a compatible plasticizer of the tetramethylene sulfone type, such as those disclosed in U.S. Pat. Nos. 2,219,006, 2,451,299 and 3,423,491 and a polyol having a molecular weight from about 62 to about 20,000; the weight ratio of the sulfolane plasticizer to polyol in the mixture is disclosed to vary from about 0.66:1 to about 5:1 and preferably from about 0.8:1 to 1.3:1. The stated purpose of varying the relative proportions of these materials was to modify the ability of the fibers to separate salt from sea water. Such fibers made by the processes of U.S. Pat. Nos. 3,532,527 and 3,494,780, while useful in the desalinization of sea water, are not satisfactory for use in hemodialysis as hollow fibers in artificial kidneys.

Cellulose acetate membranes having diverse forms has been the subject of extensive research funded by the National Institutes of Health and the Office of Saline Water since about the middle 1960's. The National Institute of Arthritis and Metabolic Diseases has also funded research directed to the modification of known cellulose acetate hollow fibers to evaluate their potential for use in artificial kidneys. A three year project of this type, having as its major objective the development of a cellulose acetate hollow fiber artificial kidney, was conducted by The Dow Chemical Company, Western Division Research Laboratories in 1971–1973, under NIH Contract No. 70-2302. Under that contract cellulose acetate fibers were made by melt spinning a mixture of cellulose acetate and triethylene glycol, and some of the resultant fibers were incorporated into artificial kidneys and clinically tested in hemodialysis. The best artificial kidneys which were made during that project, while successful in the sense that they were used safely in dialyzing a number of test patients in a clinic were nevertheless unsuccessful in that their concurrent transport properties for removal of water and low molecular weight solutes such as urea and creatinine were not as good as artificial kidneys then available which employed cellulose hollow fibers; the problem with these kidneys was that water removal rates were too high and the ratio of blood solute to water removed was too low, and the project was dropped.

Since the early 1970's, when hollow fiber artificial kidneys were first commercially made available by Cordis Dow Corp. in the United States, the hollow fibers used in such commercial artificial kidneys have been substantially exclusively cellulose fibers. These fibers have been either the product of the cuproammonium process or the process of Lipps U.S. Pat. No. 3,546,209. Although cellulose hollow fibers have enjoyed widespread market acceptance as the best form of semipermeable membrane for use in artificial kidneys to the present time, it is acknowledged by the skilled artisan that there are numerous, recurring production problems in melt spinning such fibers and incorporating them into leak-free artificial kidneys. For example, tensile strength of the fibers is relatively low and fiber breakage makes handling during fiber processing and assembly into a dialysis chamber both complex and difficult. Because of such difficulties with cellulose capillary fibers there is a continuing need for semipermeable capillary fibers which are inexpensive, easy to melt spin and process into artificial kidneys on a commercial scale, and which possess the capacity to remove blood solutes such as urea, creatinine, uric acid, and water at rates which are higher than those which characterize present day cellulose capillary fibers.

The primary objective of this invention is to provide a new cellulose acetate hollow fiber which is improved relative to heretofore known cellulose ester and cellulose hollow fibers in having selectively controllable permeability characteristics that make possible the fabrication of artificial kidneys containing such fibers which provide water and solute clearances that are superior to those which characterize present day commercial artificial kidneys containing cellulose hollow fibers. A related objective is to provide a process for making the improved cellulose acetate fibers of this invention.

SUMMARY OF THE INVENTION

This invention provides novel cellulose acetate semipermeable hollow fibers having a combination of permeability and clearance characteristics for water and solutes in blood having molecular weights less than about 1400 that are variable relative to each other and controllable so as to provide optimized operating characteristics when used in an artificial kidney for hemodialysis. Optimum operating characteristics for an artificial kidney refers to a high rate of clearance for waste blood solutes relative to the rate of water removal to thereby enable health protecting blood purification in minimum time.

The new fibers of this invention are made from a novel spin melt composition. This composition enables cellulose acetate to be dry spun, cooled in air and taken up on reels without prior leaching. The new spin melt composition comprises a mixture of cellulose acetate and certain proportions of polyethylene glycol having a molecular weight between about 150 and about 600 and certain proportions of glycerine; this composition can be melt spun into hollow fibers which are stronger and easier to process into artificial kidneys than cellulose fibers and yet possess a favorable combination of water and blood solute permeability characteristics; these permeability characteristics are further enhanced and optimized by subjecting the spun fibers to certain, controlled post-spin processing steps. Permeability of these fibers can be varied and controlled by adjusting the relative quantities of each of the three constituents of the melt spinning composition and optimization of the ratio of low molecular weight blood solute to water clearance results when such composition adjustments are made in conjunction with controlled cooling and a controlled degree of cold drawing, or stretching, of the spun fiber immediately after cooling and prior to leaching from the spun fiber any of the glycerine or polyethylene glycol constituents in the cooled fiber. By dry spinning into air at ambient temperature and appropriate control of the degree of cold draw and careful selection of the amounts of each constituent in the melt spin composition it is possible to produce cellulose acetate fibers having preselected combination clearance properties and higher ratios of solute clearance to water clearance than those of heretofore known cellulose acetate hollow fibers.

The resultant spectrum, or family, of fibers constitute the improved product of this invention.

The improved process of this invention comprises steps which control and correlate the melt spin composition and cooling of spun fibers with the degree of cold draw and the conditions of leaching and drying to produce the desired permeabilities in the new cellulose acetate fiber.

DETAILED DESCRIPTION OF THE INVENTION

Figure 1:
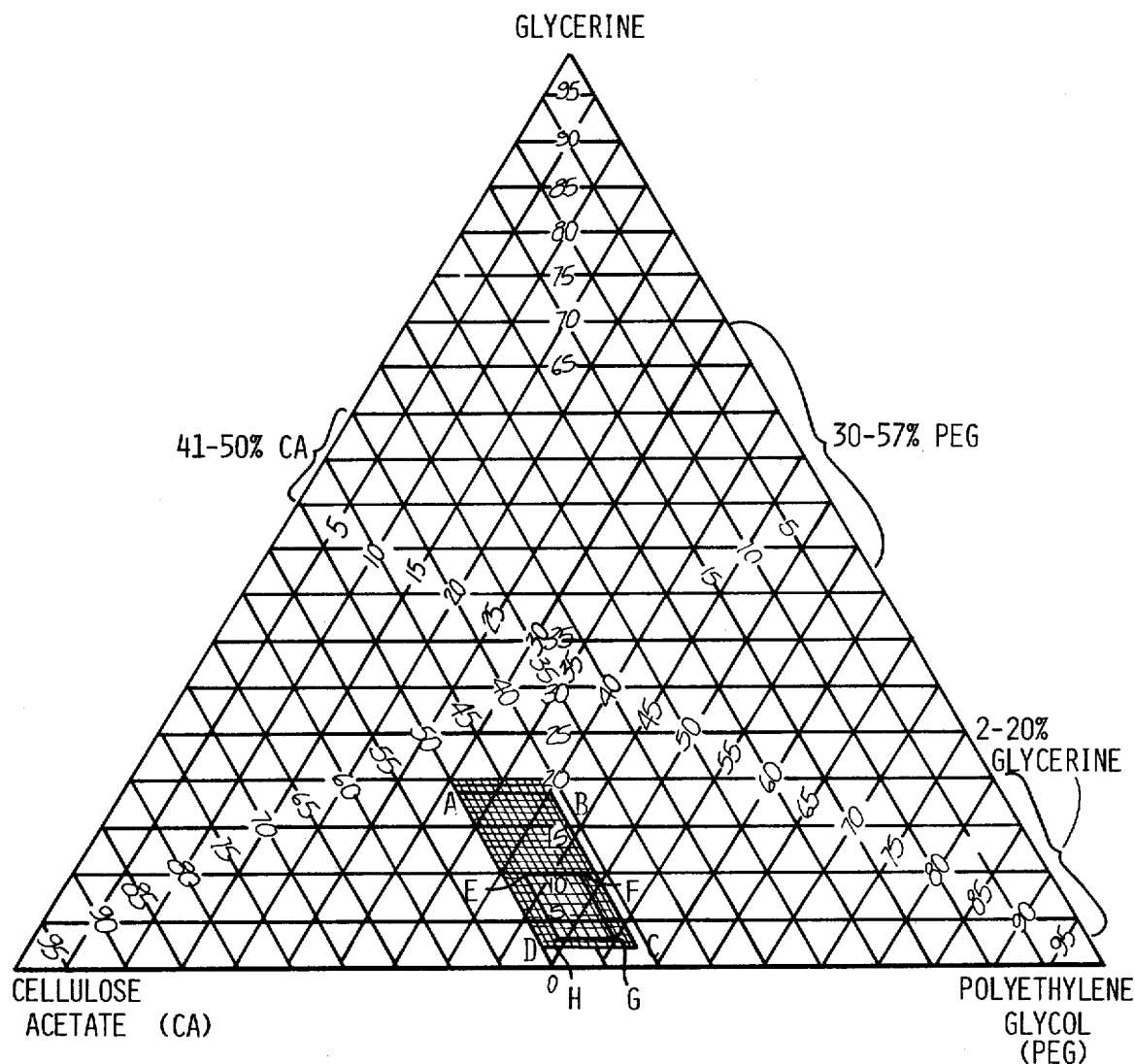
Figure 2:
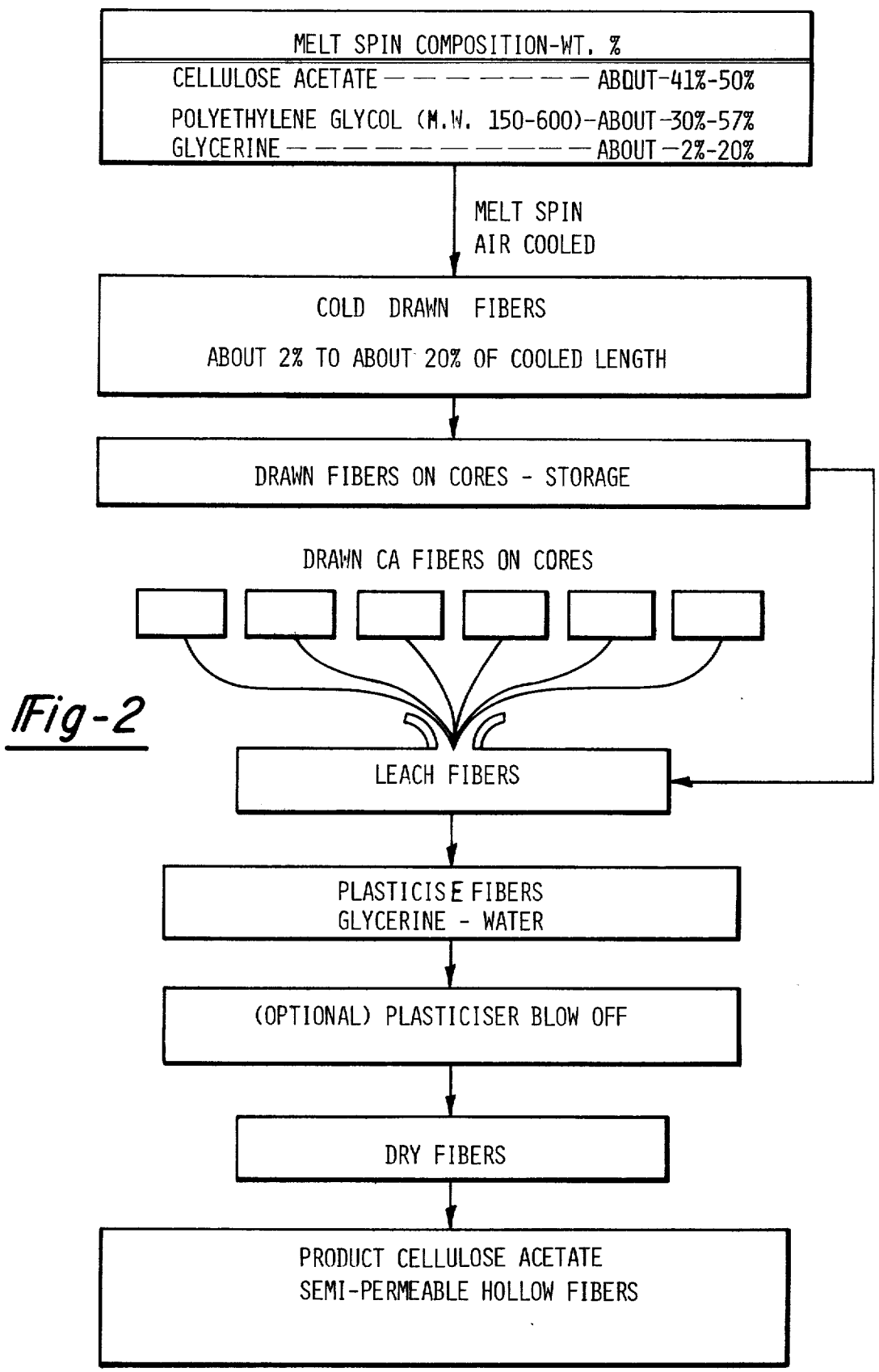

The new, improved cellulose acetate fibers of this invention described above will be further characterized and explained in connection with the melt spin composition and process of this invention which are shown in FIGS. 1 and 2, respectively.

FIG. 1 is a three component diagram showing the proportions of the three components which are combined in the melt spin compositions of this invention, as indicated by the area bounded by points A, B, C and D.

FIG. 2 schematically illustrates the steps used in processing the melt spin compositions of FIG. 1 to form the improved family of hollow capillary cellulose acetate fibers of this invention.

MELT SPIN COMPOSITION

The melt spin composition of this invention comprises in weight percent about 41 to about 50% cellulose acetate, about 2 to about 20% glycerine, and the balance polyethylene glycol having a molecular weight in the range of about 150 to about 600. As shown in FIG. 1, this family, or spectrum, of three component compositions lies within the area bounded by the extremes of each of the three components which generate the area A, B, C, D. Any of the specific compositions consisting of an amount of each of the three components within the area A, B, C, D of FIG. 1 are suitable for melt spinning into hollow capillary fibers; after cooling, water leaching out the glycol and glycerine and fabrication into an artificial kidney of current design such fibers function as well, or better, than present day cellulose fibers made by the cuproammonium process or the process of Lipps U.S. Pat. No. 3,546,209. Preferred compositions which are particularly well suited to optimization of operating characteristics for most intermittent dialysis patients are shown in FIG. 1 bounded by the area E, F, G, H.

The three components cellulose acetate, ethylene glycols and glycerine are separately old in membranes and cellulose acetate has been combined with a polyol such as glycols in compositions which also contained a plasticizer, or solvent, for the cellulose acetate of, for example, the sulfolane type as taught in U.S. Pat. No. 3,532,527. It was not known prior to this invention, however, that glycerine, a non-solvent for cellulose acetate at ambient temperatures, could be used in combination with selected low molecular weight glycols to produce strong hollow fibers having modified permeability characteristics relative to those obtained in the presence of a sulfolane type solvent; similarly, it was not known that certain proportions of glycerine in such compositions would enable the modification and control of low molecular weight solute transport through the fiber wall relative to water transport through that same wall.

Cellulose acetate, as used in this specification and claims refers to cellulose diacetate. Cellulose diacetate, as commercially available in the United States, is satisfactory for use in this invention and is preferred although amounts of mono-acetate and tri-acetate may be present, for example, up to about 25%, smaller amounts being normally present in commercial cellulose diacetate.

When cellulose acetate is dissolved in a solvent such as dimethyl sulfoxide, sulfolane, triethylene glycol or other low molecular weight glycol that is liquid at ambient temperatures and spun through a conventional spinnerette into a tow of fibers, the individual fibers tend to stick or weld together when taken up on a core. Such fibers, even though cooled below the gel point and hardened to solid fiber form, retain a quantity of solvent which apparently keeps surface areas sufficiently soft to cause sticking during take up. Heretofore, it has been necessary to leach solvent from the spun and cooled fiber before take up and a hot water leach bath has been used for this purpose. It was found, however, that hollow capillary fibers fed immediately after cooling into a leach bath caused severe fiber pulsing and resultant non-uniform wall thickness and non-uniform internal diameter. It was found, in accordance with this invention, that fiber welding could be avoided without leaching prior to take up on cores by using a low molecular weight glycol as solvent for the cellulose acetate, modified with the above specified amounts of glycerine. Apparently, the glycerine reduces the surface softening effect of the glycol and the fibers can be wound, and even stretched and wound on cores under tension, without sticking or welding. The resultant spun fibers possess improved uniformity in wall thickness and internal diameter and may be stored indefinitely at room temperature on cores for future processing into artificial kidneys.

Glycerine also apparently modifies the cellulose acetate gellation during cooling in such a manner that the resultant porosity in the fiber wall is changed. With glycerine present in the spin melt composition, as above defined, a gelled fiber results which is sufficiently strong to maintain its integrity and substantially maintain its uniformity of wall thickness and inside diameter dimension during stretching or cold drawing immediately after gellation or solidification, as will be explained hereinbelow in connection with the step of cold drawing. Surprisingly, such cold drawing further modifies the fiber wall porosity such that low molecular weight blood solutes pass more readily through that wall from blood flowing inside the fiber to a dialysate solution flowing outside the fiber. A substantial increase in such blood solute transport, that is solutes having a molecular weight up to about 1400 which includes urea, creatinine, uric acid and others up to and including Vitamin B 12, is obtained without increasing the ability of the fiber to transport water through that same wall. Although the mechanism of this change as the result of cold drawing is not fully understood, it has been found that the degree of cold drawing and the quantity of glycerine present in the spin melt composition are interrelated and interdependent. Generally stated, when using a spin melt composition consisting of cellulose acetate dissolved in a polyethylene glycol having a molecular weight in the range of about 150 to about 600 and at least about 2% of glycerine, some increase in the blood solute transport occurs as the cold drawing increases in an amount up to about 20% of the as spun fiber length. Such increase continues as the glycerine content increases but the relationship is not entirely linear; with proportions of glycerine in the spin melt composition between about 3% and 10%, and cellulose acetate between about 42% and 47%, balance polyethylene glycol, improvement in the ratio of blood solute transport to water transport occurs as the degree of cold drawing increases up to about 15% of the as spun fiber length and at 43%-45% cellulose acetate excellent results are obtained at about 10%. Maximum improvement in the ratio of blood solute transport to water transport is obtained with compositions selected from the preferred area EFGH as shown in FIG. 1 and the optimum degree of cold draw can be easily established for the selected composition by a few simple tests.

HOLLOW FIBER PROCESS USING MELT SPIN COMPOSITION

As may be seen in FIG. 2, the process comprises the steps of forming the above described melt spin composition, melt spinning hollow fibers and cooling same to a gelled self-supporting state and stretching or cold drawing the fibers. The stretched fibers may be stored, or a plurality of tows consolidated into bundles of fibers, for example, 3,000 to 30,000 fibers, for further processing in preparation for assembly into artificial kidneys. The fibers in a consolidated bundle are passed through a leaching tank to remove the glycol and glycerine, thus forming a bundle of semipermeable hollow fibers. The leached bundle is then replasticized with a glycerine-water solution, excess glycerine removed and the fibers dried. The dried fibers are the improved product of this invention.

Formulating the melt spin composition may be accomplished in any convenient manner with conventional mixing equipment, the important feature being to insure sufficient mixing to obtain an intimate uniform mixture. For example, dry cellulose acetate powder is blended with a weighed amount of polyethylene glycol and glycerine in a high-shear Hobart mixer; the mixed material is further homogenized and blended by feeding the same into a heated counter-rotating twin screw extruder and the molten extrudate then forced through a spinnerrette, for example, a 16-32 hole spinnerrette of the type including conventional gas supply means for injecting gas into the core of the extrudate. A preferred gas for this purpose is nitrogen but other gases may be satisfactorily employed, including carbon dioxide, air, or other innocuous gas. The extrudate exiting from the spinnerrette is subjected to cooling, such as forced air cooling of varying force and/or temperature, to cause gellation and solidification of the extrudate into solid, self-supporting fibers. Typically, the fibers are capillary size, that is in the range of about 150 to about 300 microns internal diameter and having a wall thickness in the range of about 20-50 microns. While the preferred fibers of this invention are particularly adapted for use in hemodialysis in artificial kidneys, the advantages of dry spinning and forming of fibers which may be taken up on supporting cores without prior leaching are equally applicable to fibers adapted for other uses such as ultrafiltration, etc. Such other fiber may satisfactorily have outside diameters in the range of about 350 to 400 microns and wall thicknesses in the range of about 10 to about 80 microns.

In the process of this invention the short time period immediately after the extrudate exits from the spinnerrette openings is extremely important to the attainment of the desired permeability of the product fibers. During that period of time, the porosity, and thus permeability, of the resultant fiber is determined as a joint function of the cooling rate and the cold drawing or stretching to which the fibers are subjected. Porosity, for a given melt spin composition, is increased, at any given degree of tension on the fibers, by a drastic quenching of the molten fiber relative to the porosity which results from a less drastic quench or a slower gellation of the extrudate into fibers. Increasing porosity which results from such quenching normally affects the ability of the fiber to transport water and may be employed, as needed, to preselect or modify the ultrafiltration rate of the resultant fiber when used in hemodialysis. By increasing the rate of flow of ambient temperature air across the extrudate, one may effect minor adjustments in the resultant fiber porosity; similarly, a like effect may be obtained by lowering the temperature of the cooling medium or both may be adjusted to achieve optimum conditions. It is preferred to employ ambient temperature air for cooling, commercially satisfactory results having been obtained without resort to cooling to below ambient temperatures.

Cold drawing, or stretching, is satisfactorily effected by passing the extruded and solidified fibers over a series of rolls, or spaced apart series of rolls such as Godet rolls; the desired degree of cold drawing may be obtained by control of the rate of rotation of the second roll, or second group of rolls in the line of flow of the fibers. Good correlation between the degree of fiber cold drawing and the preset, or measured, rate of rotation of the downstream set of rolls is usually obtained and for a particular desired percentage of cold draw, it is necessary only to accurately control the rate of rotation of the downstream set of rolls relative to the upstream set of rolls. Take up or winding of the cold drawn, or stretched fibers on cores or reels may be accomplished with commercially available winders such, for example, as Leesona winders, adequate care being taken to maintain slight tension on the fibers during takeup.

In the preferred form of the process, a plurality of cold drawn cores or reels, are mounted to feed a plurality of tows of fibers through a conventional gathering means to form a consolidated bundle and thereafter the consolidated fibers are leached to remove the glycerine and polyethylene glycol components. The leaching treatment can be carried out by any convenient means such as passing the bundle of fibers through a bath of selected solvent, or by semi-batch immersion of the cores or rolls in such solvent. The leaching solvent may be any solvent which is a good solvent for the plasticizer and glycerine and a poor solvent for cellulose acetate, water being preferred. Aqueous solutions, alcohols and combinations thereof have been satisfactorily employed for example, methanol, ethanol, propanal, and mixtures thereof, dilute aqueous solutions of sodium sulfate, magnesium sulfate and sodium chloride. Leaching may be carried out at ambient or elevated temperatures and higher than ambient temperatures are recommended up to, for example, 80–90 degrees C. The preferred leaching procedure is to employ a primary and secondary leach bath, the first bath at a higher temperature than ambient and preferably in the range of about 80–90 degrees C. for about 5–30 seconds and the secondary leach for 1–10, preferably 2–4 minutes at ambient temperatures. As a guide to selecting the optimum primary leach temperature to produuce fibers having the desired water transport rate, it has been found that as the percentage content of cellulose acetate increases between 41% and 50% that the water transport rate, relative to cellulose fibers, decreases at a slower rate as the temperature of the leach increases from about 20 degrees C. up to about 80 degrees C. Increasing leach temperatures between about 50 degrees and 90 degrees C. tends to increase the transport permeability of the fibers for urea, creatinine, and other low molecular weight solutes up to and including Vitamin B 12.

After the fibers have been leached, and the desired permeability thereby established, conversion of the fibers to a dry form requires replasticization with glycerine or its equivalent. Replasticization is preferably accomplished with a water/glycerine solution which may satisfactorily contain from about 30% to about 60% glycerine by weight with good results having been obtained with 50% glycerine aqueous solution.

As a guide, as the glycerine concentration in the replasticization solution is decreased below about 50% the rate of water transport also decreases. As indicated in FIG. 2, after replasticization the fibers may be dried by passing through a conventional drying oven or by other means such as vacuum removal. Optionally, a portion of the glycerine may be removed by forced air blow off by passing the fiber bundle through or past, a set of opposed air knives at pressures and times to reduce the glyercine present in the fiber. As the glycerine is reduced by drying, or vacuum or increasing air blow off pressures from about one to about six pounds per square inch a reduction occurs in both the water and blood solute transport capacities of the resultant fibers. Typically satisfactory drying conditions are about 40 degrees C. to 80 degrees C. for 1–6 minutes; at longer drying times above 60 degrees C., blood solute transport rates decrease and thus lower temperatures should be used to optimize the ratio of blood solute to water removed during intermittent hemodialysis.

The improved cellulose acetate hollow fibers of this invention, which may be made from the above described melt spin compositions by using the steps enumerated and selected conditions thereof as above explained, possess a combination of water transport and solute transport capabilities which distinguish them from heretofore known cellulose acetate hollow fibers. The defining properties of the fibers of this invention are most conveniently expressed as coefficients. The water transport permeability is expressed as the ultrafiltration coefficient, $K_{UFR}$, and is in the range of about 2 to about 6 millimeters per hour per square meter per millimeter of mercury pressure differential between the opposite sides of the membrane wall. The $K_{UFR}$ coefficient provides a number represetative of the ability of the semipermeable fiber to pass water per unit of pressure gradient across the effective membrane area. The effective membrane area is the exposed portion of surface area of the semipermeable wall of the hollow fibers which is in contact with the fluid and through which water transport may occur, for example, per square meter, or other selected area.

The solute transport permeability is expressed as the overall diffusive mass transfer, or dialysis, coefficient of the membrane, $K_m$. The dialysis coefficient, $K_m$, provides a number representative of the ability of the semipermeable cellulose acetate fiber to separate a dissolved component, or solute, in a fluid on one side of the semipermeable wall of the fiber and transport, or pass, that component to another fluid in contact with the opposite side of that same wall surface as a function of the effective area of the semipermeable membrane and the concentration of the solute in the two fluids on opposite sides of that semipermeable wall. While the rate at which solute is transported from the blood to the dialysate is critically important as the limiting variable which determines the minimum required time to complete hemodialysis using an artificial kidney containing the cellulose acetate hollow fibers of this invention, and that rate is determinable from the clearance for each solute which is expressed in terms of milliliters of solute per minute, $K_m$ provides a number which indicates the ability of the fiber to pass solutes as a function of the molecular size, or weight, of the solute, and the units of $K_m$ are centimeters per minute. Clearance refers to the number designated as $K_rU$, for renal urea clearance, or $K_rCr$, for renal creatinine clearance, in milliliters per minute, as defined in Chapter 41 by Frank A. Gotch in Vol. II of the treatise entitled *The Kidney*. For the improved fibers of this invention the membrane coefficient for urea, $K_{urea}$, is in the range of about 0.015 to about 0.045 centimeters per minute; the membrane coefficient for creatinine, $K_{creatinine}$, is in the range of about 0.013 to about 0.027 centimeters per minute; and the membrane coefficient for Vitamin B 12, $K_{B12}$, is in the range of about 0.002 to about 0.005 centimeters per minute. The ratio of the dialysis coefficient of the membrane, $K_m$, to the ultrafiltration coefficient, $K_{UFR}$, is above about 3:1 based upon the above stated ranges of coefficients and the units for each as stated.

For hemodialysis the preferred combination of water and solute transport capability is a $K_{UFR}$ in the range of about 3 to about 5 milliliters per hour per square meter per millimeter of mercury, a $K_{urea}$ above about 0.020 centimeters per minute and a ratio of $K_{urea}/K_{UFR}$ above 5:1. Such fibers make possible the construction of artificial kidneys of the general type manufactured by Cordis Dow Corporation which substantially reduce the time required for a hemodialysis treatment and provide flexibility and ease of control during hemodialysis relative to commercial hollow fiber artificial kidneys which use semipermeable cellulose fibers made by the process of Lipps U.S. Pat. No. 3,546,209. Relative to such artificial kidneys, which typically provide a $K_{UFR}$ below about 1 millimeter per hour per square meter per millimeter of mercury as operated at ambient room temperature, the rate of water removal from blood being dialyzed with artificial kidneys using the same effective area of the new cellulose acetate fibers of this invention under similar use conditions is two to six times as high. While a $K_{UFR}$ above about 6 may require replacement of a part of the removed water before the treatment reaches its preselected water content at the end of the hemodialysis, a faster water removal rate presents certain advantages relating to ease and flexibility of control during the dialysis. Moreover, artificial kidneys using cellulose acetate fibers having the solute coefficients above defined, per square meter, enable faster removal of the blood solutes such as urea, creatinine, uric acid, etc. For example, artificial kidneys providing 1 square meter of effective surface of the cellulose acetate fibers of this invention having coefficients within the above given range typically provide a urea clearance in the range of about 100 to about 165 milliliters per minute, a creatinine clearance in the range of about 80 to about 135 milliliters per minute and a $B_{12}$ clearance in the range of about 15 to about 45 milliliters per minute.

This invention provides a range of spin compositions and variable processing parameters on the steps used to manufacture the herein described fibers which makes it relatively easy to preselect, and to manufacture cellulose acetate fibers having optimized $K_{UFR}$ and $K_m$ characteristics and to fabricate such fibers into artificial kidneys preselected to satisfy particular patient requirements. By using particular melt spin compositions and selecting appropriate processing conditions, it is relatively easy to produce cellulose acetate fibers of this invention concurrently possessing any particular desired rate of water and solute removal rates within the ranges above indicated. Thus, it will be appreciated that the improved cellulose acetate fibers of this invention provide a convenient means for facile, convenient fabrication of a family of artificial kidneys offering controlled and preselected rates for concurrent removal of water and solutes during hemodialysis.

The following examples specifically illustrate the best mode contemplated to make the new cellulose acetate fibers of this invention and will serve to further exemplify the effects on the $K_{UFR}$ and $K_m$ as a function of melt spin composition, and the degree of cold drawing to which the fibers are subjected during processing; they also illustrate typical fiber transport capabilities which characterize the improved cellulose acetate fibers of this invention.

EXAMPLES 1-9

Three batches of cellulose acetate fibers were prepared using different melt spin compositions. The first composition contained in percent by weight, 43% cellulose acetate and 57% polyethylene glycol having a molecular weight of approximately 400; the second composition contained 43% cellulose acetate, 50% polyethylene glycol having a molecular weight of approximately 400 and 7% glycerine and the third melt spin composition contained 43% cellulose acetate, 39% polyethylene glycol having a molecular weight of about 400 and 18% glycerine. The same cellulose acetate material was used in each of the three melt spin compositions and was obtained from Eastman Chemical Products, Inc., Kingsport, Tenn., under the designation CA-400-25, which cellulose acetate contains an approximate acetyl content of 39.9% as defined by ASTM Method D-871-72 and a falling ball viscosity of 17-35 seconds as measured by ASTM Method D-1343. The polyethylene glycol in each of the three melt spin compositions was USP Grade PEG E-400 from The Dow Chemical Company and the glycerine was USP Grade from The Dow Chemical Company, Midland, Mich.

Each batch was prepared by thoroughly mixing the powdered cellulose acetate with the polyethylene glycol, and with the glycerine, in a standard laboratory Hobart mixer by slowly adding the liquid ingredients with the mixer paddle turning. After uniform admixture, the mixture was introduced into the feed zone of a heated extruder maintained at about 390 degrees F. and the extruded mass was then forced through a multi-opening spinnerrette outfitted so as to introduce air through the center of each spinnerrette to thus form hollow fibers.

Three spools of fibers were prepared from each batch by varying the take-up conditions between the spinnerrettes and spooling. A first spool of fibers having no cold forming, or stretching, was formed by passing the fibers through air to a first and second set of rolls rotating at the same speed. A second spool of fibers was formed by controlling the speed of the second set of rolls to a rotation rate 10% faster than the first set of rolls, and a third spool resulted from the second set of rolls operating at a 20% faster speed than the first set.

The nine spools of fibers thus produced were used to establish water and urea transport coefficients in a laboratory test apparatus for the fibers as will now be described. The test apparatus consisted of a fluid reservoir equipped with a magnetic stirrer, and a dialyzer test beaker fitted with a magnetic stirrer, a top closure plate having pressure fittings and connectors for receiving the ends of the potting sleeves attached to each end of a bundle of fibers containing between 160 and 192 fibers per bundle. The fiber bundle was bent into a U-shape and inserted into the beaker and connected to the closure plate; one sleeve was connected by a fluid line to a pump connected with a line to the reservoir and the other sleeve was connected by a return line to the reservoir to thereby enable fluid from the reservoir to be pumped under controllable pressure through the lumens of the fibers located in the dialysis beaker. The beaker was also provided with dialysate inlet and outlet connections and during testing the fibers were immersed in a surrounding stirred pool of either water for the $K_{UFR}$ test or a water-urea solution for the $K_{urea}$ tests.

The water transport coefficient, $K_{UFR}$, was determined by pumping water under pressure through the fibers and measuring the increase in water volume external to the fibers in the dialyzer beaker, the tests being run at 21 degrees C. $K_{UFR}$ was then calculated for each test using the fibers identified in Table I in milliliters per square meter per hour per millimeter of mercury pressure differential as shown in Table II.

The urea coefficient, $K_{urea}$, was determined by providing a water pool in the supply reservoir and pumping same through the fiber lumens, the pool surrounding the fibers in the dialysis beaker being initially a water-urea solution. Measurements were made to determine the urea concentration in the recirculating fluid at time intervals.

The tests were conducted at 21° C. and there was no pressure differential across the fiber wall surface during the tests.

The urea coefficient, $K_{urea}$, was determined by taking into account the difference in the concentrations of urea in the supply reservoir and in the dialysis beaker on the outside of the fibers as a function of time and the fiber area in accordance with the equation:

$N = K_{UREA} \cdot A(C_1 - C_2)$ wherein N represents the flux across the membrane in moles per minute, $C_1$ is the initial urea concentration, $C_2$ is the final, or measured, concentration and A is the area of the fiber wall or membrane between the two solutions.

In a two-chamber system without a pressure differential or resultant ultrafiltration the transfer of urea across the membrane wall may be integrated over a time interval, t, to yield the further equation:

$$\ln\left[\frac{(C_1 - C_2)^{t=0}}{(C_1 - C_2)^t}\right] = \left[\frac{(V_1 + V_2)}{(V_1 V_2)} \cdot A\right] K_{UREA} \cdot t$$

wherein $V_1$ is the volume of supply reservoir solution, and $V_2$ is the volume of the solution in the dialysis beaker.

In the tests, the volumes, $V_1$ and $V_2$ and the area A are constants so that a plot of the values on each side of the integrated equation produces a straight line, the slope of which allows $K_{urea}$ in units of centimeter per minute to be calculated. The values thus developed for the nine fiber lots are shown in Table II in the column headed, $K_{UREA}$, (cm/min.)$\times 10^{-3}$.

TABLE I

| SPIN COMPOSITION BATCH BLEND | Fiber Size Int. dia. (micron) | Fiber Size Outer dia. (micron) | Ave. Wall (Membrane) Thickness (micron) | Fiber Size Int. dia. (micron) | Fiber Size Ext. dia. (micron) | Ave. Wall (Membrane) Thickness (micron) | Fiber Size Int. dia. (micron) | Fiber Size Ext. dia. (micron) | Ave. Wall (Membrane) Thickness (micron) |
|---|---|---|---|---|---|---|---|---|---|
| Batch #1 43% polymer (CA-400-25) 57% plasticizer (PEG-E-400) | 179 | 260 | 40.5 | 180 | 261 | 40.5 | 180 | 264 | 42.0 |
| Batch #2 43% polymer (CA-400-25) 50% plasticizer (PEG-B-400) 7% plasticizer (glycerine) | 185 | 260 | 37.5 | 193 | 273 | 40.0 | 195 | 274 | 39.5 |
| Batch #3 43% polymer (CA-400-25) 39% plasticizer (PEG-E-400) 18% plasticizer (glycerine) | 174 | 253 | 39.5 | 213 | 282 | 34.5 | 224 | 297 | 36.5 |

TABLE II

| | 0% DRAW | | | 10% DRAW | | |
|---|---|---|---|---|---|---|
| SPIN COMPOSITION BATCH | $K_{UFR}$ $\frac{ml}{hr \cdot M^2 MMH_g}$ | $K_{UREA}$ $\frac{cm}{minute} \times 10^{-3}$ | $\frac{K_{UREA}}{K_{UFR}}$ | $K_{UFR}$ $\frac{ml}{hr \cdot M^2 MMH_g}$ | $K_{UREA}$ $\frac{cm}{minute} \times 10^{-3}$ | $\frac{K_{UREA}}{K_{UFR}}$ |
| Batch #1 43% $\frac{polymer}{(CA-400-25)}$ 57% $\frac{plasticizer}{(PEG-E-400)}$ | 6.01 | 22.95 | 3.82 | 6.33 | 21.92 | 3.46 |
| Batch #2 43% $\frac{polymer}{(CA-400-25)}$ 50% $\frac{plasticizer}{(PEG-E-400)}$ 7% $\frac{plasticizer}{(glycerine)}$ | 5.18 | 23.29 | 4.49 | 4.64 | 25.3 | 5.45 |
| Batch #3 43% $\frac{polymer}{(CA-400-25)}$ 39% $\frac{plasticizer}{(PEG-E-400)}$ 18% $\frac{plasticizer}{(glycerine)}$ | 4.61 | 17.48 | 3.79 | 5.94 | 17.92 | 3.55 |

| | 20% DRAW | | |
|---|---|---|---|
| SPIN COMPOSITION BATCH | $K_{UFR}$ $\frac{ml}{hr \cdot M^2 MMH_g}$ | $K_{UREA}$ $\frac{cm}{minute} \times 10^{-3}$ | $\frac{K_{UREA}}{K_{UFR}}$ |
| Batch #1 | | | |

TABLE II-continued

| | | | |
|---|---|---|---|
| 43% polymer/(CA-400-25) | 7.20 | 24.74 | 3.44 |
| 57% plasticizer/(PEG-E-400) | | | |
| Batch #2 | | | |
| 43% polymer/(CA-400-25) | 4.14 | 22.90 | 5.53 |
| 50% plasticizer/(PEG-E-400) | | | |
| 7% plasticizer/(glycerine) | | | |
| Batch #3 | | | |
| 43% polymer/(CA-400-25) | 4.93 | 18.19 | 3.69 |
| 39% plasticizer/(PEG-E-400) | | | |
| 18% plasticizer/(glycerine) | | | |

EXAMPLE 10

Artificial kidneys of the type commercially available from Cordis Dow Corp. under the commercial designation C-DAK Artificial Kidneys were manufactured using cellulose acetate fibers and four such kidneys were evaluated in the laboratory and compared to four similar kidneys used on hemodialysis patients in clinics. The cellulose acetate fibers were made from a melt spin composition having a nominal composition approximately the formulation identified as Batch No. 2 in Table II. The spin composition was formulated by using the same ingredients which were used in making the fibers in Examples 1-9 except that the composition was employed in commercial equipment; the same mixing steps and spinning procedures therein described were employed and the degree of cold drawing of the spun fibers varied from about 7% to about 12% with an average of about 10%.

Four selected kidneys having the effective membrane area shown in Table III were evaluated first in the laboratory and similar kidneys taken from the same production lot were then evaluated in a clinic on hemodialysis patients undergoing intermittent hemodialysis.

The laboratory evaluations were performed in a similar manner to those described above in connection with Examples 1-9. The clinic evaluations for kidneys I, II and IV were made on patients using an average blood flow rate of 200 ml/min. and a dialysate flow rate of 500 ml/min., whereas, kidney III was operated at an average blood flow rate of 192.5 ml/min. and a dialysate flow rate of 500 ml/min. In the clinic evaluations $K_{UFR}$ represents the mean value over the total treatment time and urea clearance was measured at the times shown by the subscripts 1-4 in Table III; normal clinical operating procedures were employed and no unusual events occurred during the hemodialysis treatments represented in the clinic portion of Table III. The data in Table III resulted from laboratory and clinic operation at 37° C. whereas the data set forth in Table II resulted from operation at 21° C. For comparison with the coefficients $K_{UFR}$ and $K_{UREA}$ set forth above in Example 10, and in Table II, calculations have been made for corrected $K_{UFR}$ and $K_{UREA}$ coefficients at 21° C. and are shown in Table III.

To arrive at $K_{UFR}$ at 21° C. the experimentally determined $K_{UFR}$ at 37° C. was corrected using the equation for steady, laminar flow of fluid:

$$V=(n_f\pi \cdot D^4 \cdot \Delta P)/128 \mu L$$

wherein
 V = UFR in ml/sec.
 D = Average pore diameter
 $n_f$ = number of pores
 ΔP = transmembrane pressure gradient
 L = pore length
 μ = fluid viscosity
and the equation for normalizing temperature $$V(21°\text{ C.})=[\mu(37°\text{ C.})/\mu(21°\text{ C.})]V(37°\text{ C.})$$

The effect of temperature upon the diffusive mass transfer rate can be estimated using the equation $$D\mu/T=C \text{ (contant)}$$

wherein
 D = diffusion coefficient (membrane $K_{ov}$)
 T = temperature in °K.
(See CHEMICAL ENGINEERS HANDBOOK, Perry, 4th Ed., p. 14-23).

To arrive at $K_{UREA}$ at 21° C. the experimentally determined $K_{UREA}$ at 37° C. was corrected using the formula:

$$K_{ov}(T)=[\mu(37°\text{ C.})/\mu(T)][T/310°\text{ K.}]$$

TABLE III

| | LABORATORY | | | | | | | |
|---|---|---|---|---|---|---|---|---|
| | Effective Membrane Area | $K_{UFR}$ ml/(hr·M² MM Hg) | | $K_{UREA}$ cm/minute × 10⁻³ | | $K_{UREA}/K_{UFR}$ | | |
| KIDNEY | Square Meters | 37° C. | 21° C. | 37° C. | 21° C. | 37° C. | 21° C. | |
| I | 0.84 | 6.34 | 4.70 | 31.1 | 21.9 | 4.91 | 4.65 | |
| II | 0.81 | 5.99 | 4.44 | 29.8 | 21.0 | 4.97 | 4.73 | |
| III | 0.82 | 6.38 | 4.73 | 29.0 | 21.5 | 4.55 | 4.55 | |
| IV | 0.88 | 6.34 | 4.70 | 31.6 | 22.2 | 4.98 | 4.72 | |

TABLE III-continued

| | UREA CLEARANCE ml/Minute at 37° C. | | MEAN*** $K_{UFR}$ ml/hr·M² MM Hg | | $K_{UREA}$**** cm/minute × 10⁻³ | | $\dfrac{K_{UREA}}{K_{UFR}}$ | |
|---|---|---|---|---|---|---|---|---|
| KIDNEY | With U.F.* | W/O U.F.** | 37° C. | 21° C. | 37° C. | 21° C. | 37° C. | 21° C. |
| I | 134[1] | 127 | 3.57 | 2.65 | 29.7 | 20.9 | 8.32 | 7.89 |
| II | 128[2] | 125 | 3.26 | 2.42 | 29.8 | 21.0 | 9.14 | 8.67 |
| III | 137[3] | 130 | 4.25 | 3.16 | 31.8 | 22.4 | 7.50 | 7.09 |
| IV | 133[4] | 128 | 3.84 | 2.85 | 30.4 | 21.4 | 7.92 | 7.51 |

*With Ultrafiltration
**Without Ultrafiltration
***Average over hemodialysis treatment
****Based on urea clearance without ultrafiltration
[1]Measured after 60 minutes into a 4.5 hour dialysis
[2]Measured after 115 minutes into a 6 hour dialysis
[3]Measured after 245 minutes into a 4.75 hour dialysis
[4]Measured after 265 minutes into a 5.0 hour dialysis By referring to Tables II and III it may be seen that the ratio of $K_{UREA}$ to $K_{UFR}$ under the clinical operating conditions shown is substantially higher than corresponding ratios established under laboratory conditions. In all instances, the cellulose acetate fibers used in the clinic produced $K_{UREA}$ to $K_{UFR}$ ratios substantially above the preferred 5:1 ratio.

What is claimed is:

1. A cellulose acetate hollow fiber having an internal diameter in the range of about 100 to about 350 microns and a wall thickness in the range of about 20 to about 60 microns, said wall having a selective permeability when used in hemodialysis for water and solutes to be removed from blood represented by an ultrafiltration coefficient $K_{UFR}$ in the range of about 2 to about 6 milliliters per hour per square meter per millimeter of mercury and a urea coefficient $K_{UREA}$ in the range of about $15 \times 10^{-3}$ to about $45 \times 10^{-3}$ centimeters per minute, said fiber characterized by the concurrent capability of separating urea from blood and water from blood at rates represented by a minimum ratio of the coefficients $K_{UREA}/K_{UFR}$ of 3 to $1 \times 10^{-3}$.

2. A cellulose acetate hollow fiber having an internal diameter in the range of about 100 to about 350 microns and a wall thickness in the range of about 20 to about 60 microns, said wall having a selective permeability when used in hemodialysis for water and solutes to be removed from blood represented by an ultrafiltration coefficient $K_{UFR}$ in the range of about 2 to 6 milliliters per hour per square meter per millimeter of mercury, a urea coefficient $K_{UREA}$ in the range of about $15 \times 10^{-3}$ to about $45 \times 10^{-3}$ centimeters per minute, and a creatinine coefficient $K_{creatinine}$ in the range of about $13 \times 10^{-3}$ to about $27 \times 10^{-3}$ centimeters per minute, said fiber characterized by the concurrent capability of separating urea from blood and water from blood at rates represented by a minimum ratio of the coefficients $K_{UREA}/K_{UFR}$ of 3 to $1 \times 10^{-3}$.

3. A cellulose acetate hollow fiber having an internal diameter in the range of about 100 to about 350 microns and a wall thickness in the range of about 20 to 60 microns, said wall having a selective permeability when used in hemodialysis for water and solutes to be removed from blood represented by an ultrafiltration coefficient $K_{UFR}$ in the range of about 2 to 6 milliliters per hour per square meter per millimeter of mercury, a urea coefficient $K_{UREA}$ in the range of about $15 \times 10^{-3}$ to about $45 \times 10^{-3}$ centimeters per minute, a creatinine coefficient $K_{creatinine}$ in the range of about $13 \times 10^{-3}$ to about $27 \times 10^{-3}$ centimeters per minute and a Vitamin B 12 coefficient $K_{B12}$ in the range of about $2 \times 10^{-3}$ to about $5 \times 10^{-3}$ centimeters per minute, said fiber characterized by the concurrent capability of separating urea from blood and water from blood at rates represented by a minimum ratio of the coefficients $K_{UREA}/K_{UFR}$ of 3 to $1 \times 10^{-3}$.

4. A fiber in accordance with claim 1, wherein said ultrafiltration coefficient $K_{UFR}$ is in the range of about 5 to about 6 and said urea coefficient $K_{UREA}$ is in the range of about $30 \times 10^{-3}$ to about $45 \times 10^{-3}$, and wherein said minimum ratio of $K_{UREA}/K_{UFR}$ is 5 to $1 \times 10^{-3}$.

5. A fiber in accordance with claim 2, wherein said creatinine coefficient $K_{creatinine}$ is in the range of about $20 \times 10^{-3}$ to about $27 \times 10^{-3}$, and wherein said minimum ratio of $K_{UREA}/K_{UFR}$ is 5 to $1 \times 10^{-3}$.

6. A process for making cellulose acetate hollow fibers which comprises the steps of
   (1) providing an intimate mixture of about 41 to about 50 weight percent cellulose acetate, about 2 to about 20 weight percent glycerine, and about 30 to about 57 percent polyethylene glycol having a molecular weight in the range of about 150 to about 600,
   (2) fabricating hollow fibers from a molten mass of said mixture,
   (3) cooling said fibers,
   (4) cold drawing said fibers an amount in the range of about 2% to about 20% of said cooled fiber length,
   (5) leaching said fiber to remove therefrom said polyethylene glycol and said glycerine, and
   (6) replasticizing said fiber with glycerine and thereafter drying same.

7. A process in accordance with claim 6 wherein said cellulose acetate in said mixture is in the range of about 42 to about 47 weight percent.

8. A process in accordance with claim 6 wherein said cold drawing is an amount in the range of about 10 to about 15% of the length of said cooled fiber.

* * * * *